United States Patent Office 3,077,083
Patented Feb. 12, 1963

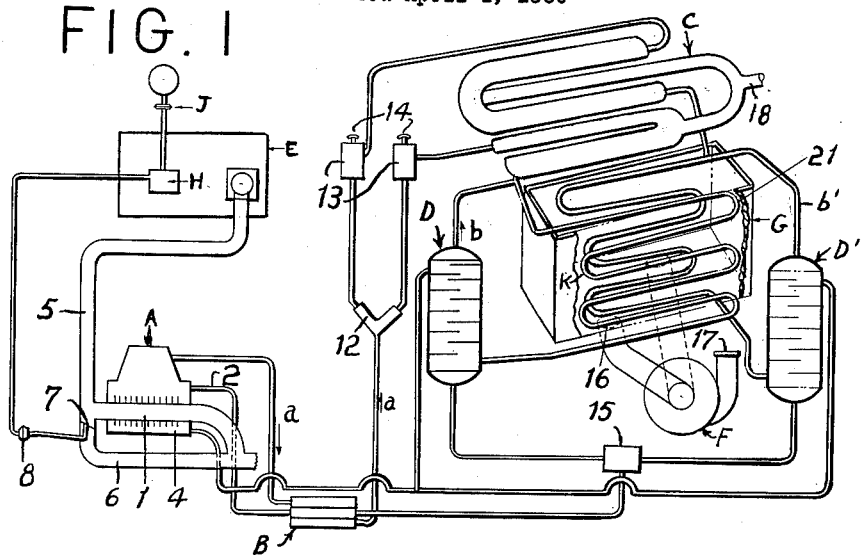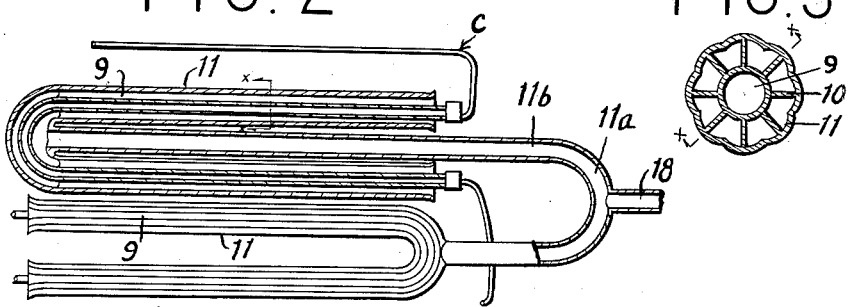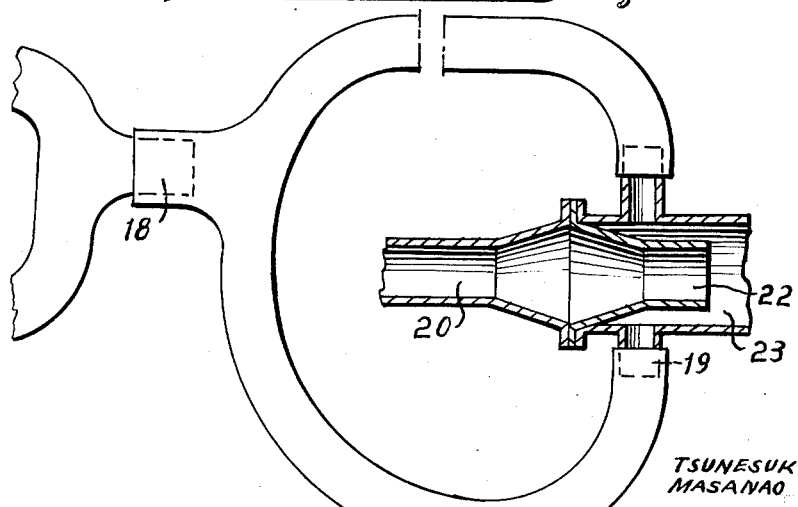

3,077,083
ABSORPTION COOLING APPARATUS FOR AUTOMOBILE
Tsunesuke Kubo, No. 24 Honchodori 3-chome Nakano-ku, Tokyo, Japan, and Masanao Kawamura, No. 60 Fujimi-cho Nakano-ku, Tokyo, Japan
Filed Apr. 1, 1960, Ser. No. 19,381
1 Claim. (Cl. 62—239)

The present invention relates to absorption cooling apparatus for automobile cabin in which an absorption refrigerating machine is used and provides a cooling apparatus of this type in which the waste heat of the exhaust gas of the engine and the heat of the cooling water of the engine cylinder are utilized as the heat source of the generator with atmospheric air drawn in by utilizing the suction of a nozzle attached to a part of the muffler of the engine exhaust being used as the cooling air of the condenser.

The main object of this invention is to provide a cooling apparatus for an automobile cabin in which the waste heat of the exhaust gas of the engine is utilized for evaporating the cooling medium in order to obtain the most economical use of the engine exhaust.

Another object is to provide cooling apparatus in which atmospheric air drawn in by suction of the exhaust gas is utilized for cooling and condensing the cooling medium and thus power necessary to produce circulating cooling air and the space necessary for the air circulating apparatus can be saved.

Yet another object of this invention is to provide cooling apparatus for automobile cabin in which cooling effects can be obtained irrespective of the power output of the engine.

A specific example of the cooling apparatus according to this invention is illustrated by the accompanying drawings in which:

FIG. 1 is a schematic view of the cooling apparatus for an automobile cabin;

FIG. 2 is a front view of the condenser partly broken away;

FIG. 3 is a vertical section taken on line X—X in FIG. 2;

FIG. 4 is a longitudinal section of a part of a muffler showing a nozzle arranged therein.

Referring to the drawings, in FIG. 1 A is a generator, B is a heat exchanger, C is an ammonia condenser, D is a hydrogen separator, E is an automobile engine, F is a fan, G is a cooling room for cooling air, H is a carburetor, J is a governor for a distributor, and K shows an evaporator.

Generator A has a heating pipe 1 therein, connected to the exhaust pipe 5 of the engine E.

Fins 4 having many small holes drilled therethrough (not shown) are attached to the peripheral wall of the said heating pipe 1 for improving heat conductivity and preventing the turbulent motion of the ammonia solution caused by the vibration of automobile when running.

A bypass 6 is branched from a joint between the heating pipe 1 and the engine exhaust pipe 5.

A regulating valve 7 is arranged just before the inlet of the heating pipe 1 and is connected to a governor 8, which is of the same type as governor J for regulating the electrical distributor, and is connected to the engine carburetor H, in such a way that it will restrict an inlet of the heating pipe 1 an amount corresponding to the increased speed of the engine and widen said inlet in case of decrease of the engine speed.

Condenser C, having a cross section as shown in FIG. 3, is provided with an ammonia pipe 9 at its center having a plurality of radial fins 10 equally spaced on its outer periphery and the open end U-shaped outer pipe 11 surrounding said fins.

The space between the ammonia pipe 9 and the outer pipe 11 being divided by said fins 10 forming a plurality of longitudinal chambers to permit the cooling air to pass therethrough.

Exit 18 of the air for cooling the ammonia condenser C is connected to the curved part 11a of the U pipe 11b connecting a pair of said outer pipes 11.

In this example, said outer piper 11 is shown as opened to atmosphere, but, it may be connected to the outlet of air exhausted from said automobile cabin for improving the cooling effect, as said exhaust air is cooler than the outside air.

Exit 18 is connected to the air suction tube 19 which is connected to a chamber 23 surrounding an orifice 22.

Said orifice 22 is connected to the exhaust pipe of a muffler 20 so that the exhaust gases passing through orifice 22 generate a partial vacuum in said chamber 23.

The apparatus according to this invention operates as follows:

In the FIGURE, arrows affixed with $a$ show the path of ammonia, arrows affixed with $b$ show the path of hydrogen.

In the operation of the apparatus concentrated solution of ammonia enters at the inlet 2 of the generator A and is heated by heating pipe 1 and the fins 4 thereof, resulting in evaporation of the ammonia. Said evaporated ammonia enters into the heat exchanger B and leaving therefrom proceeds to the branch 12.

Attached to branch 12 is a duplicate set of reservoirs 13, valves 14, condensers C, and hydrogen separators D and as their operation is similar, only the operation of one set is hereinafter explained.

From branch 12 ammonia enters into the reservoir 13 having a relief valve 14, is cooled and liquefied in a condenser C, at the outlet of which is added hydrogen coming out of the hydrogen separator D evaporating in the pipe 21 of air cooling room G, then enters into the lower part of the hydrogen separator D, then down to the reservoir 15 passing through the heat exchanger B, coming back to the generator A and thus complete a cycle of operation.

Air to be cooled is introduced through a suitable intake of outer air provided at the top part of the cooling room G by suction of the fan F, cooled by the wall surface of the pipe 21 and drawn into the fan F through the mouth 16 thereof and thence sent through outlet 17 to a required cabin or the like.

In the absorption cooling apparatus for an automobile according to this invention, waste heat of the engine exhaust gas or the heat reserved in the dicharged liquid for cooling the engine cylinder is utilized for evaporating the cooling medium, and the suction generated by the engine exhaust is utilized for introducing the outer air for cooling and condensing the ammonia so that cost of the apparatus and its maintenance is reduced and the operation is automatic and the fan is the only moving part.

By adjusting said regulating valve 7, constant optimum cooling effect can be obtained irrespective of the engine output.

We claim:

An absorption cooling apparatus for a compartment of a vehicle having an internal combustion engine with exhaust pipe comprising a generator containing a liquefied refrigerant absorbent mixture, means for conducting exhaust from the engine exhaust pipe to said generator for heating said refrigerant mixture, a refrigerant condenser connected to said generator for receiving and returning said refrigerant mixture, an air cooling area, means for drawing air through said area and discharging same to the vehicle compartment, means cooled by said refrigerant mixture extending within said area for cooling the air passing therethrough and said refrigerant condenser consisting of a pipe having a series of U-shaped bent portions, a plurality of equally spaced radial fins extending from the periphery of said pipe, a plurality of outer pipes each having an open ended U-shape configuration encasing each one of said condenser pipe U-shaped bent portions and enclosing those of said fins along their respective U-shaped portions of said pipe providing a plurality of chambers along said condenser pipe for the passage of cooling air therethrough, a chamber, an orifice in said chamber connected to the engine exhaust pipe for producing a vacuum in said chamber by the passage of the exhaust and at least one U-shaped connector pipe having its ends connected to the bases of a pair of said outer pipes and also connected to said chamber for drawing cooling air through said outer pipes connected thereto.

References Cited in the file of this patent

UNITED STATES PATENTS

| | | |
|---|---|---|
| 1,806,712 | Schulman | May 26, 1931 |
| 2,009,067 | Mulholland | July 23, 1935 |
| 2,592,712 | Knoy | Apr. 15, 1952 |
| 2,667,040 | Keating | Jan. 26, 1954 |

FOREIGN PATENTS

| | | |
|---|---|---|
| 527,527 | France | July 27, 1921 |